May 27, 1952     V. M. FREY     2,598,046
COLLAPSIBLE GOLF BAG CART
Filed Dec. 11, 1950     2 SHEETS—SHEET 1
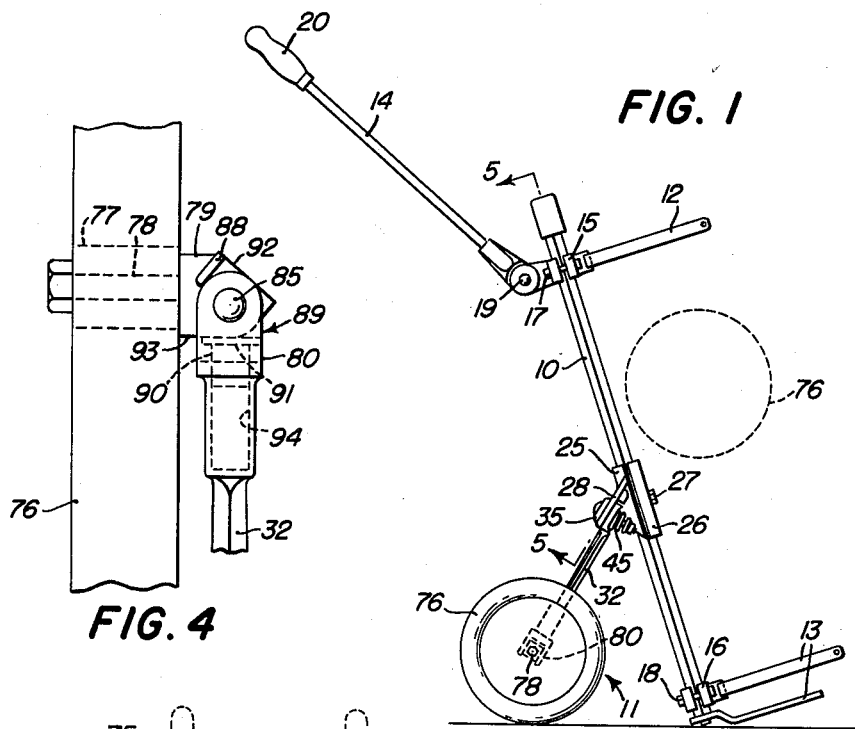
FIG. 1
FIG. 4
FIG. 3
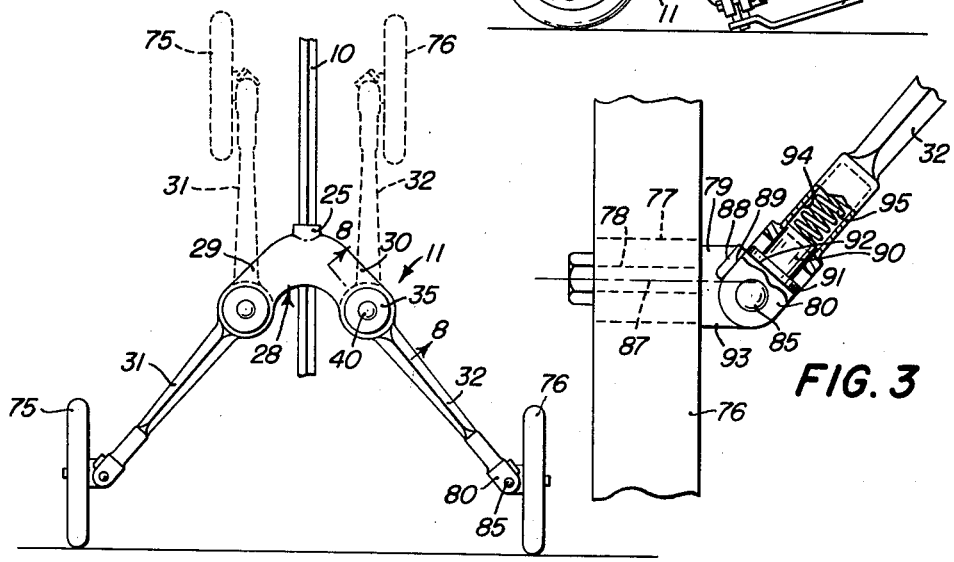
FIG. 2
INVENTOR.
VERNON M. FREY
BY
ATTORNEY May 27, 1952 V. M. FREY 2,598,046
COLLAPSIBLE GOLF BAG CART
Filed Dec. 11, 1950 2 SHEETS—SHEET 2
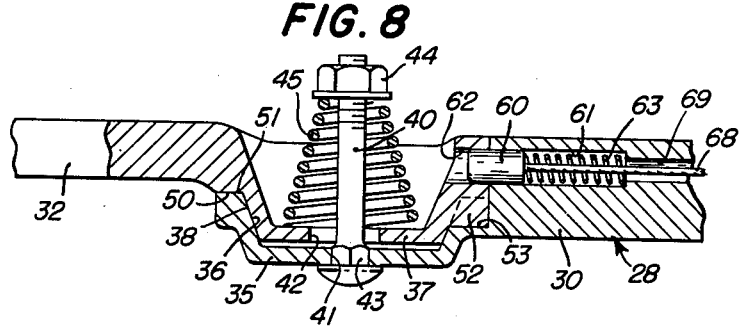
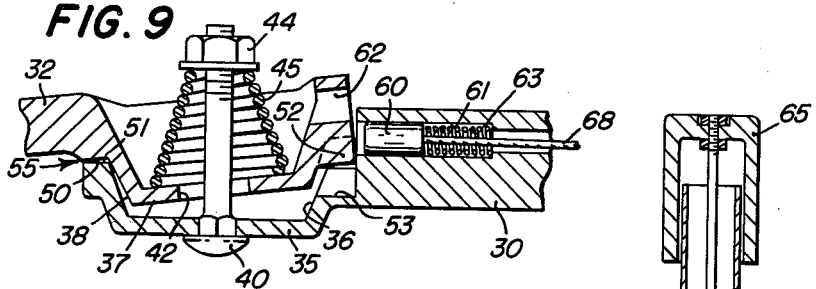
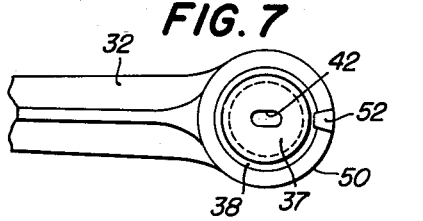
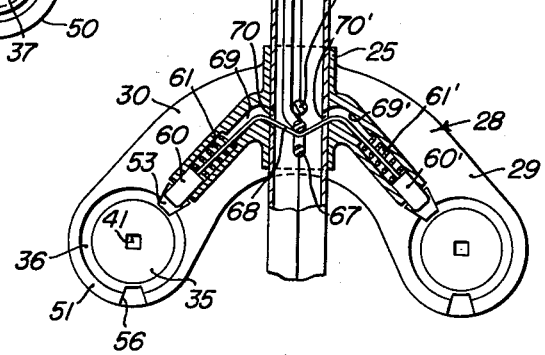
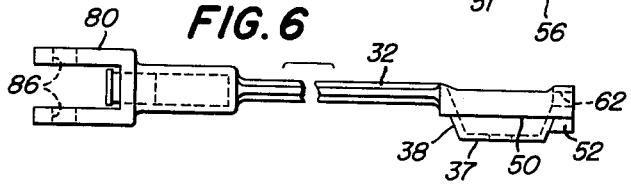
INVENTOR.
VERNON M. FREY
BY
ATTORNEY Patented May 27, 1952

2,598,046

UNITED STATES PATENT OFFICE 2,598,046

COLLAPSIBLE GOLF BAG CART

Vernon M. Frey, East Moline, Ill.

Application December 11, 1950, Serial No. 200,209

11 Claims. (Cl. 280—38)

The present invention relates to collapsible carts for transporting golf bags and has for its principal object the provision of a novel and improved cart which is simpler in construction, lighter in weight, and less expensive to manufacture than carts of this class heretofore known in the art, but without sacrifice in strength and durability. A further object has to do with the provision of a golf bag cart which is adjustable for various size golf bags. Still another object relates to the provision of collapsible wheel supports which are easier to operate but collapses to a more compact arrangement and has positive means for locking the parts in transport position, thus preventing the collapse of the car during use.

Heretofore, collapsible wheel supports, which could be collapsed to fold the wheels flat against the sides of the golf bag, have been designed with a complicated arrangement of folding braces or links between the axles and the frame, in order to obtain sufficient strength. A specific object of my invention relates to the provision of a cart having a pair of wheels supported simply on a pair of legs without any additional braces or links, thus presenting a stream-lined appearance. A related object has to do with the provision of a strong and durable locking mechanism by which the necessity for extra braces and links is obviated.

These and other objects and advantages of my invention will become apparent to those skilled in the art after a consideration of the following description, with reference to the drawings appended hereto, in which Figure 1 is a side elevational view of a golf bag cart embodying the principles of my invention.

Figure 2 is a fragmentary front elevational view of the cart, showing the transport position of the wheels in solid lines and showing in broken lines the collapsed position of the wheels for storage purposes.

Figure 3 is a fragmentary view, partly in section, drawn to an enlarged scale, showing the pivot mounting of one of the wheel axles on its associated leg, the wheel being in working or transport position.

Figure 4 is a fragmentary view of the axle mounting similar to Figure 3 but showing the wheel in collapsed position.

Figure 5 is a longitudinal sectional view taken through the frame and yoke along a line 5—5 in Figure 1.

Figure 6 is a bottom plan view of one of the legs.

Figure 7 is a fragmentary front view of the end of the leg which attaches to the supporting yoke.

Figure 8 is a sectional view taken along a line 8—8 in Figure 2 but drawn to an enlarged scale, and showing the leg joint locked in transport position.

Figure 9 is a sectional view similar to Figure 8 but showing the leg tilted to unlock it from the supporting yoke and ready to be swung from transport to storage position.

Referring now to the drawings, the cart comprises an upright tubular frame member 10, a wheeled carriage 11, upper and lower golf bag supports 12, 13 and a draft bar 14. The frame member 10 is preferably of square cross section and the bag supports are secured to the member 10 by conventional clamps 15, 16 secured by bolts 17, 18. The draft bar 14 is pivotally mounted on the upper clamp 15 by means of a bolt 19 and is adjustable about the axis of the latter in a well-known manner, and is provided with a handle 20 on its free end, which extends forwardly from the frame 10.

The carriage 11 comprises a pair of clamp elements 25, 26 adapted to receive therebetween the tubular frame member 10, to which the elements are secured by a bolt 27 extending through the elements and member perpendicular to the axis of the latter. The lower element 25 is cast integrally with a support yoke 28 having a pair of downwardly and forwardly inclined, oppositely extending arms 29, 30. A pair of legs 31, 32 are swingably mounted on the arms 29, 30, respectively, but inasmuch as the mounting means for the two legs are similar in construction, only one will be described here in detail.

The arm 30 is provided near its outer end with a cup-shaped hinge plate 35 having a conical internal bearing surface 36. The leg 32 has a similar cup-shaped hinge plate 37 which is provided with an external conical bearing surface 38 adapted to fit into the internal bearing surface 36 of the other hinge plate 35 in nested relation. The hinge plates are pivotally connected by a hinge bolt 40, which extends through a square aperture 41 in the hinge plate 35 on the arm and an elongated aperture 42 in the hinge plate 37 on the leg. The bolt 40 has a square neck 43 which fits snugly within the square aperture 41 and has a nut 44 threaded on the other end. A conically coiled compression spring 45 is disposed coaxially around the bolt 40 between the nut 44 and the hinge plate 37, with its larger diameter end abutting against the inner end of the cup-shaped plate 37 to urge the latter toward the other hinge plate 35 with a pressure which urges the conical bearing surfaces 36, 38 into contact with each other.

The hinge plate 37 is provided with an annular shoulder 50 at the upper edge of the bearing surface 38, which bears against the peripheral edge 51 of the cup-shaped hinge plate 35. A projection 52 is disposed on the shoulder 50 and conical surface 38 at a location on the periphery of the plate 37 directly opposite the leg 32. This projection interfits with a cooperative recess 53 in the edge 51 and bearing surface 36 and is held in engaged position by the force of the spring 35. It is evident that the projection 52 and recess 53 lock the leg 32 against angular movement about the axis of the bolt 40.

This locking action can be disabled by tilting the leg 32, as indicated in Figure 9, relative to the arm 30 and bolt 40. This is accomplished by forcing the leg angularly about a fulcrum 55 at a point on the peripheral bearing surfaces 50, 51 diametrically opposite the projection 52 and recess 53, respectively. This raises the projection out of the recess and permits the leg to be swung about the axis of the pivot bolt 40 to a raised position as indicated in dotted lines in Figure 2. In the raised or storage position, the projection 52 drops into another recess 56 (Figure 5) in the bearing surfaces 36, 51 of the arm hinge plate 35, the spring 45 urging the hinge plates into locked position to lock the leg in storage position. The aperture 42 is elongated to accommodate tilting action of the hinge plate 37 relative to the bolt 40.

Inasmuch as the golf cart is intended to be pushed as well as pulled, I have found it desirable to provide a detent for preventing the legs from tilting relative to their supporting arms in the event that they encounter an obstruction as they are pushed ahead of the golfer. Such an encounter could result in one or both legs collapsing when tilted far enough to disengage the projection from the recess. This detent is preferably in the form of a latch element 60 slidably disposed within a passage 61 in the arm casting 30. The latch element 60 is urged by a spring 63 outwardly of the passage 61 into a recess 62 in the periphery of the hinge plate 37 adjacent the projection 52. When the leg is in operating or transport position, the recess 62 is in register with the passage 61 and receives the outer end of the latch element 60 to restrain the leg from tilting into the position shown in Figure 9.

The latch element is retracted by means of a control handle 65 in the form of a hollow cap embracing the upper end of the tubular frame member 10 and attached to a rod 66 extending downwardly through the member 10. The lower portion of the rod is slightly offset to pass the bolt 27, and has an eye 67 at its lower end. A flexible cable or wire 68 passes through the eye and is connected at opposite ends thereof, respectively, to the two latch elements 60, 60'. The cable 68 passes through passages 69, 69' which are extensions of the passages 61, 61' within which the latch elements 60, 60' are slidable. The passages 69, 69' extend through the arms 30, 29 toward the center of the yoke and terminate at the clamp element 25 in register with openings 70, 70' in the tubular member 10.

The latch elements are retracted simultaneously by pressing downwardly on the control handle 65, thereby forcing the rod 66 down to draw the elements inwardly by means of the cable.

The outer ends of the legs 31, 32 are carried on a pair of wheels 75, 16, respectively. Since the wheel mountings are similar, only one will be described herein. The wheel 76 is provided with a hub 77 which is journaled on an axle 78. The axle is provided with a pivot block 79 which is disposed between the legs of a fork 80 on the end of the leg 32. The block 79 is pivotally connected to the fork 80 by a pivot pin 85 which extends through an opening in the block and aligned openings 86 in the fork 80. The axis of the pin 85 extends fore and aft and is spaced below the axis of the axle 78 which is indicated by a broken line 87 in Figure 3. A stop lug 88 is fixed to the block 79 and engages the flat top surface 89 of the fork 80, in the operating position of the axle, thus preventing the axle from buckling under the weight of the cart.

The axle can be folded relative to the leg, however, by swinging the axle about the pin 85 in a counterclockwise direction as viewed in Figure 3. As shown in Figure 4, when the leg 32 is raised to inactive, or storage position, the leg can be folded flat against the leg.

The axle is retained in operating position by means of a detent plunger 90 which has a flat head 91 adapted to bear on a flat camming surface 92 on the axle block 79. In folded position of the axle, the plunger 90 bears on a second flat camming surface 93 on the bottom of the block 79. The plunger 90 is slidable longitudinally within a recess 94 in the end of the fork 80 and is urged into contact with the camming surfaces 92, 93 of the block 79 by a compression spring 95 within the recess 94.

It is now evident that during operation of the cart the weight is carried on the pivot pin 85. Inasmuch as the pin 85 is below the axis 87 of the wheel 76, the weight tends to prevent folding of the axle during operation, for in so doing the weight of the cart would necessarily be raised. The camming action of the spring actuated detent 90 aids in retaining the axle in operating position by pressure against the camming surface 92.

Now, to collapse the cart for storage purposes and to reduce the dimensions to enable the cart to be carried in the trunk of an automobile, the control handle is pressed downwardly to retract the latches 60, 60'. Each leg can then be tilted rearwardly about the fulcrum 55 to release the projection 52 from the recess 53 and then swung upwardly about the pivot bolt 40 to the raised position indicated in dotted lines in Figures 1 and 2. As the leg is raised, the operator can fold the wheel and axle about the pivot pin 85. The draft bar 14 can be folded down against the frame 10 after loosening the bolt 19.

The cart can be adjusted for different size bags by loosening the clamping bolts 17, 18 and sliding the bag supports 12, 13 toward or away from each other.

I do not intend my invention to be limited to the exact details shown and described herein except as set forth in the following claims.

I claim:

1. A collapsible golf bag cart comprising in combination, an upright tubular frame member, a support attached to said member and having a pair of hinge plates with hinge bolts mounted thereon, a pair of legs swingably mounted on said hinge bolts, respectively, and movable axially thereof, the adjacent surfaces of said legs and hinge plates being provided with interfitting projections and recesses, respectively, springs mounted on said hinge bolts for yieldably holding said surfaces together to maintain said projections and recesses in engagement to lock said leg against swinging about the axes of said hinge bolts, a pair of latch elements shiftably mounted on said support and engageable with said legs to prevent axial movement thereof, a control handle at the upper end of said tubular frame member, means connecting said control handle with said latch elements operative to disengage the latter by movement of said handle, a pair of axles pivotally mounted on the remote ends of said legs, respectively, wheels journaled on said axles, and foldable therewith against said legs in storage position, and spring actuated detents acting between said axles and said legs for retaining said wheels in either working or storage positions.

2. A collapsible golf bag cart as set forth in claim 1, including the further provision that said connecting means comprises a rod extending through said tubular handle and flexible cable means attached to the lower end of said rod and connected to said latch elements.

3. A collapsible golf bag cart as set forth in claim 1, including the further provision that each of said axles is pivotally mounted on the associated leg by means of a pivot pin disposed below the axis of said axle and said axle is provided with a flattened cam surface, said leg having a recess in the adjacent end in which is disposed said spring actuated detent, the latter being engageable with said cam surface in one position of said axle.

4. A collapsible golf bag cart comprising in combination, an upright tubular frame member, a support attached to said member and having a pair of hinge plates with hinge bolts mounted thereon, a pair of legs swingably mounted on said hinge bolts, respectively, and movable axially thereof, the adjacent surfaces of said legs and hinge plates being provided with interfitting projections and recesses, respectively, springs mounted on said hinge bolts for yieldably holding said surfaces together to maintain said projections and recesses in engagement to lock said legs against swinging about the axes of said hinge bolts, a pair of latch elements shiftably mounted on said support and engageable with said legs to prevent axial movement of said legs relative to said hinge plates which would tend to disengage said projections from said recesses, a control handle at the upper end of said tubular frame member, means connecting said control handle with said latch elements operative to disengage the latter by movement of said handle, and a pair of wheels rotatably mounted on said legs, respectively.

5. A collapsible golf bag cart comprising in combination, an upright tubular frame member, a support attached to said member and having a pair of hinge plates with hinge bolts mounted thereon, a pair of legs swingably mounted on said hinge bolts, respectively, and movable axially thereof, the adjacent bearing surfaces of said legs and hinge plates having conical nested bearing portions, each pair of nested bearing portions being provided with an interengageable projection and recess, respectively, adjacent the periphery thereof, a coil spring encircling each hinge bolt for urging said bearing surfaces together but yieldable when said leg is forced angularly about a fulcrum at a point on said bearing surface diametrically opposite said projection and recess to retract said projection from said recess and thus release said leg for movement about the axis of said hinge bolt.

6. A collapsible golf bag cart comprising in combination, an upright tubular frame member, a support attached to said member and having a pair of hinge plates with hinge bolts mounted thereon, a pair of legs swingably mounted on said hinge bolts, respectively, and movable axially thereof, the adjacent bearing surfaces of said legs and hinge plates having conical nested bearing portions, each pair of nested bearing portions being provided with an interengageable projection and recess, respectively, adjacent the periphery thereof, each of said bearing portions on said legs having an enlarged opening to receive said hinge bolt providing for tilting movement of said leg relative to the axis of said hinge bolt about a fulcrum at the periphery of said bearing surface diametrically opposite said projection to retract the latter from its associated recess, and a spring acting between said bolt and said leg to urge said surfaces together to retain said projection in said recess.

7. A collapsible golf bag cart comprising in combination, an upright tubular frame member, a support attached to said member and having a pair of hinge plates with hinge bolts mounted thereon, a pair of legs swingably mounted on said hinge bolts, respectively, and movable axially thereof, the adjacent bearing surfaces of said legs and hinge plates having conical nested bearing portions, each pair of nested bearing portions being provided with an interengageable projection and recess, respectively, adjacent the periphery thereof, and a pair of latches slidably mounted on said support and engageable with said legs, respectively, to hold the latter against said tilting movement.

8. A golf bag cart as set forth in claim 7, including the further provision of a control handle mounted on said tubular member and a control element attached to said handle and extending through said tubular member and connected with both of said latches for releasing the latter.

9. A golf bag cart comprising in combination, an upright tubular frame member, a support attached to said member, said support comprising a yoke having oppositely extending arms provided with hinge plates having hinge bolts mounted thereon, a pair of legs swingably mounted on said hinge bolts, respectively, and tiltable relative thereto, the adjacent surfaces of said legs and hinge plates having conical nested bearing portions, each pair of nested bearing portions being provided with an interengageable projection and recess, respectively, spring means acting between each hinge bolt and its associated leg for urging said bearing portions into nested relation but yieldable to tilting of the leg to retract the projection from its recess, said yoke having passages extending from said hinge plates to said tubular frame member, respectively, said frame member having openings registering with said yoke passages, a pair of latch elements slidable within said passages into and out of engagement with said legs, respectively, and arranged to restrain the latter from tilting, a control handle mounted near the upper end of said tubular frame member, and connections extending downwardly from said handle through said frame member and said passages to both of said latch elements for releasing the latter to permit tilting the legs to disengage said projections from said recesses and thus release said legs for swinging movement of the latter from transport position to storage position.

10. A golf bag cart as set forth in claim 9, including the further provision of a pair of axles pivotally mounted on the outer ends of said legs, respectively, providing for folding said axles relative to said legs, wheels journaled on said axles, and spring actuated detents mounted on said legs and engageable with said axles to retain the latter in folded position.

11. A golf bag cart as set forth in claim 10, including the further provision that said axles are pivoted on said legs by means of pivot pins disposed below the axes of said axles when the legs and axles are in transport position, whereby the weight of said cart tends to retain the axles in transport position, and stops on said axles engageable with said legs in said transport position.

VERNON M. FREY.

REFERENCES CITED

The following references are of record in the file of this patent:

UNITED STATES PATENTS

| Number | Name | Date |
|---|---|---|
| 566,521 | Leger | Aug. 25, 1896 |
| 647,366 | Blaker | Apr. 10, 1900 |
| 2,523,893 | Williamson | Sept. 26, 1950 |